US009086118B2

(12) United States Patent
Campbell et al.

(10) Patent No.: US 9,086,118 B2
(45) Date of Patent: Jul. 21, 2015

(54) LOCKING PIN WITH SPRING RETENTION MECHANISM

(75) Inventors: Richard Campbell, Tallahassee, FL (US); David Hilbig, Cairo, GA (US); David Sediles, Tallahassee, FL (US); Kristopher Wortham, Tallahassee, FL (US)

(73) Assignee: Bright Technologies, LLC, Havana, FL (US)

( * ) Notice: Subject to any disclaimer, the term of this patent is extended or adjusted under 35 U.S.C. 154(b) by 130 days.

(21) Appl. No.: 13/598,254

(22) Filed: Aug. 29, 2012

(65) Prior Publication Data

US 2013/0047410 A1 Feb. 28, 2013

(51) Int. Cl.
| | |
|---|---|
| *B23P 11/00* | (2006.01) |
| *F16B 21/04* | (2006.01) |
| *F16B 21/09* | (2006.01) |
| *F16B 21/16* | (2006.01) |
| *F16G 15/06* | (2006.01) |

(52) U.S. Cl.
CPC ..................................... *F16G 15/06* (2013.01)

(58) Field of Classification Search
CPC ...... B23P 11/00; B23P 2700/11; F16B 21/00; F16B 21/04; F16B 21/12; F16B 21/16; F16G 15/06

USPC ........... 29/11, 426.6, 525.01, 525.08–525.09; 403/79, 161, 163, 315–319; 292/58, 62
See application file for complete search history.

(56) References Cited

U.S. PATENT DOCUMENTS

| | | | | |
|---|---|---|---|---|
| 15,743 | A | * | 9/1856 | Palmer .............................. 278/96 |
| 1,646,546 | A | * | 10/1927 | Jensen ............................... 59/86 |
| 2,809,856 | A | * | 10/1957 | Alexander .................... 403/146 |
| 5,046,881 | A | * | 9/1991 | Swager ......................... 403/154 |
| 6,023,927 | A | * | 2/2000 | Epstein ............................. 59/86 |
| 6,386,573 | B1 | * | 5/2002 | Solomon ....................... 280/504 |
| 7,448,823 | B2 | * | 11/2008 | Silva ............................. 403/349 |
| 2006/0099838 | A1 | * | 5/2006 | Meyers ......................... 439/134 |

FOREIGN PATENT DOCUMENTS

GB 281556 A * 12/1927 .............. F16G 15/06

* cited by examiner

*Primary Examiner* — Alexander P Taousakis
*Assistant Examiner* — Matthew P Travers
(74) *Attorney, Agent, or Firm* — J. Wiley Horton

(57) ABSTRACT

A load pin and clevis joint for joining two or more mechanical components together. The load pin includes a retention feature that requires two separate motions to unlock the pin. In a locked state, the load pin is secured across both halves of a clevis joint so that it completely spans an open span between the two clevis halves. In the preferred embodiment, the two motions required to unlock the load pin are (1) moving the load pin linearly; and (2) rotating the load pin.

6 Claims, 20 Drawing Sheets

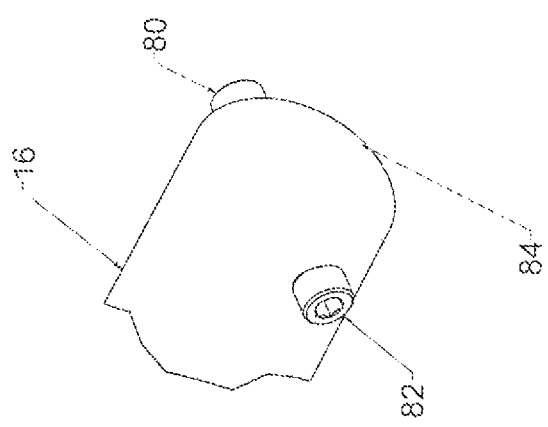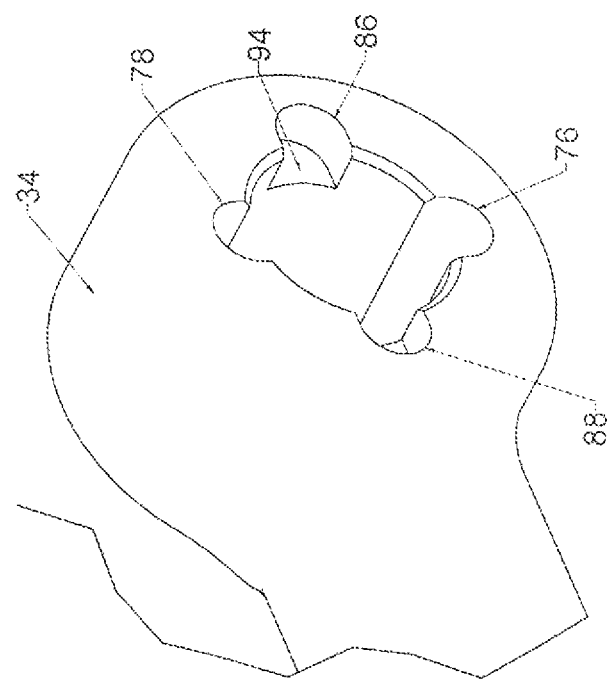
FIG. 19

LOCKING PIN WITH SPRING RETENTION MECHANISM

CROSS-REFERENCES TO RELATED APPLICATIONS

This is a non-provisional patent application that claims the benefit of an earlier-filed provisional patent application pursuant to the provisions of 37 C.F.R. §1.56(c). The earlier-filed application was assigned Ser. No. 61/528,468. It was filed on Aug. 29, 2013 and listed the same inventor.

STATEMENT REGARDING FEDERALLY SPONSORED RESEARCH OR DEVELOPMENT

Not Applicable.

MICROFICHE APPENDIX

Not Applicable

BACKGROUND OF THE INVENTION

1. Field of the Invention

This invention relates to the field of rigging. More specifically, the invention comprises a load pin for joining two or more mechanical components together. The load pin includes multiple retention features that require two separate motions to unlock the pin.

2. Description of the Related Art

There are many different devices used for locking two or more separate components together. FIG. 1 shows one such device. Anchor 12 is to be joined to loading component 14. In this example, the objective is to provide a pivoting joint between the two components, resulting in pivoting connection 10.

Transverse hole 28 is provided through both anchor 12 and loading component 14. Load pin 16 is passed through this hole. An enlarged head is provided on the opposite side of the pin (not shown in the view). Once the pin is in place, it is generally desirable to provide a feature that retains the pin in position (sometimes referred to as an "anti-backout" feature). In the example shown, Cotter pin 18 is passed through a transverse hole in the exposed portion of load pin 16. The free ends of the cotter pin are then splayed apart in order to retain the cotter pin.

FIG. 2 shows the disassembly of the example of FIG. 1. Cotter pin 18 is straightened and pulled free as shown. Load pin 16 is then pulled clear of transverse hole 28. In this view the reader may easily perceive the function of head 26, which prevents the load pin passing completely through the transverse hole.

FIG. 3 shows another very common prior art fastening device. Shackle 20 is a bow-shaped device including open span 30. The open span must generally be closed in order to encircle the component that is attached to the shackle. Load pin 16 is passed through a transverse hole in the shackle in order to close open span 30. The shackle assembly may then be used to transmit force from one component to another. For example, a first wire rope may be secured around load pin 16 while a second wire rope is secured around the opposite end of shackle 20. Tension may then be transferred between the two wire ropes.

The load pin must generally be secured in position. Head 26 is an enlarged portion that is too big to fit through the transverse hole in the shackle. Once the leading portion of load pin 16 has passed through the shackle, another component is added to prevent its being pulled back out. In the embodiment of FIG. 3, cap screw 22 is passed through an opening through the load pin. Lock nut 24 is then secured on the exposed portion of the threads belonging to the cap screw. With this arrangement, load pin 16 is secured and open span 30 is closed. However, a user wishing to remove the load pin need only unscrew lock nut 24 and pull cap screw 22 free.

The reader will thereby appreciate that the use of a load pin to close an open span in a rigging component is well known. The reader will also appreciate that it is known to secure the load pin in position so that it cannot be easily removed. However, the prior art approach to securing the load pin is cumbersome in both the securing and the removing of the load pin. In addition, the prior art approach includes numerous separate components that may easily be dropped or misplaced during the process. Finally, the prior art approach is time consuming.

Accordingly, it would be advantageous to provide a new approach to selectively securing a load pin that does not require the use of loose components and that is easy and quick to engage and disengage. The present invention provides such a solution.

BRIEF SUMMARY OF THE PRESENT INVENTION

The present invention comprises a load pin and clevis joint for joining two or more mechanical components together. The load pin includes multiple retention features that require two separate motions to unlock the pin. In a locked state, the load pin is secured across both halves of a clevis joint so that it completely spans an open span between the two clevis halves. In the preferred embodiment, the two motions required to unlock the load pin are (1) linearly pushing or pulling the load pin through the clevis joint, and (2) rotating the load pin. In an even more preferred embodiment, additional motions are required to unlock the load pin.

In some embodiments, the load pin is retained by the clevis joint so that it cannot be dropped or lost. In other embodiments the load pin is made removable. All embodiments offer a speed advantage over the prior art approaches. In addition, all embodiments provide may be cycled through a high number of locking/unlocking cycles without requiring the replacement of any hardware.

BRIEF DESCRIPTION OF THE SEVERAL VIEWS OF THE DRAWINGS

FIG. 19 is a detailed perspective view, showing an alternate embodiment using a cap screw as a lug.

REFERENCE NUMERALS IN THE DRAWINGS

| 10 | pivoting | 12 | anchor |
|---|---|---|---|
| 14 | loading component | 16 | load pin |
| 18 | cotter pin | 20 | shackle |
| 22 | cap screw | 24 | lock nut |
| 26 | head | 27 | handle |
| 28 | transverse hole | 29 | indicator groove |
| 30 | open span | 32 | inner clevis half |
| 34 | outer clevis half | 36 | set screw receiver |
| 38 | cable | 40 | shaft |
| 42 | shoulder | 44 | grip surface |
| 46 | slot | 48 | longitudinal portion |
| 50 | rotational portion | 52 | jogging portion |
| 54 | locking portion | 56 | jog |
| 58 | rearward protrusion | 60 | set screw |
| 62 | wave spring | 64 | female thread |
| 66 | slot pin | 68 | forward extreme |
| 70 | first outward facing surface | 72 | marker |
| 74 | locked position reference | 76 | first keyway |
| 78 | second keyway | 80 | first lug |
| 82 | second lug | 84 | leading end |
| 86 | first pocket | 88 | second pocket |
| 90 | first inward facing surface | 92 | second outward facing surface |
| 94 | pocket mating surface | 96 | second inward facing surface |
| 100 | spring retainer | 102 | back wall |

DETAILED DESCRIPTION OF THE INVENTION

The present invention uses a load pin to selectively close an open span in a clevis joint. The invention includes a combination of retention features that secure the load pin in the closed position. Two or more separate motions are required to defeat the retention features, thereby eliminating the possibility of the pin being unlocked inadvertently.

The retention features use combinations of linear and rotary motion for the load pin. "Linear motion" is defined as pushing the load pin into or pulling the load pin out of the clevis joint. "Rotary motion" is defined as rotating the load pin about its central axis. Some constraints imposed by the retention features are purely linear, some are purely rotational, and some are a combination of linear and rotational. When a constraint is stated as being a linear constraint, this should be understood to mean a predominately linear constraint. An example is a lug sliding in a keyway. This motion will be primarily linear. However, some rotary motion is permitted via the clearance selected between the lug and keyway.

Likewise, a constraint stated as being a rotary constraint need not be purely rotary. Some linear motion is permissible for the rotary constraint. However, the reader should understand that when a rotary constraint is stated, it is rotary motion is needed to defeat the particular retention feature.

As will be apparent to those skilled in the art, many different mechanisms can be devised to carry out the invention. The following detailed description pertains to several examples of these mechanisms. The embodiments should properly be viewed as several examples among many more possibilities.

Figure 4:
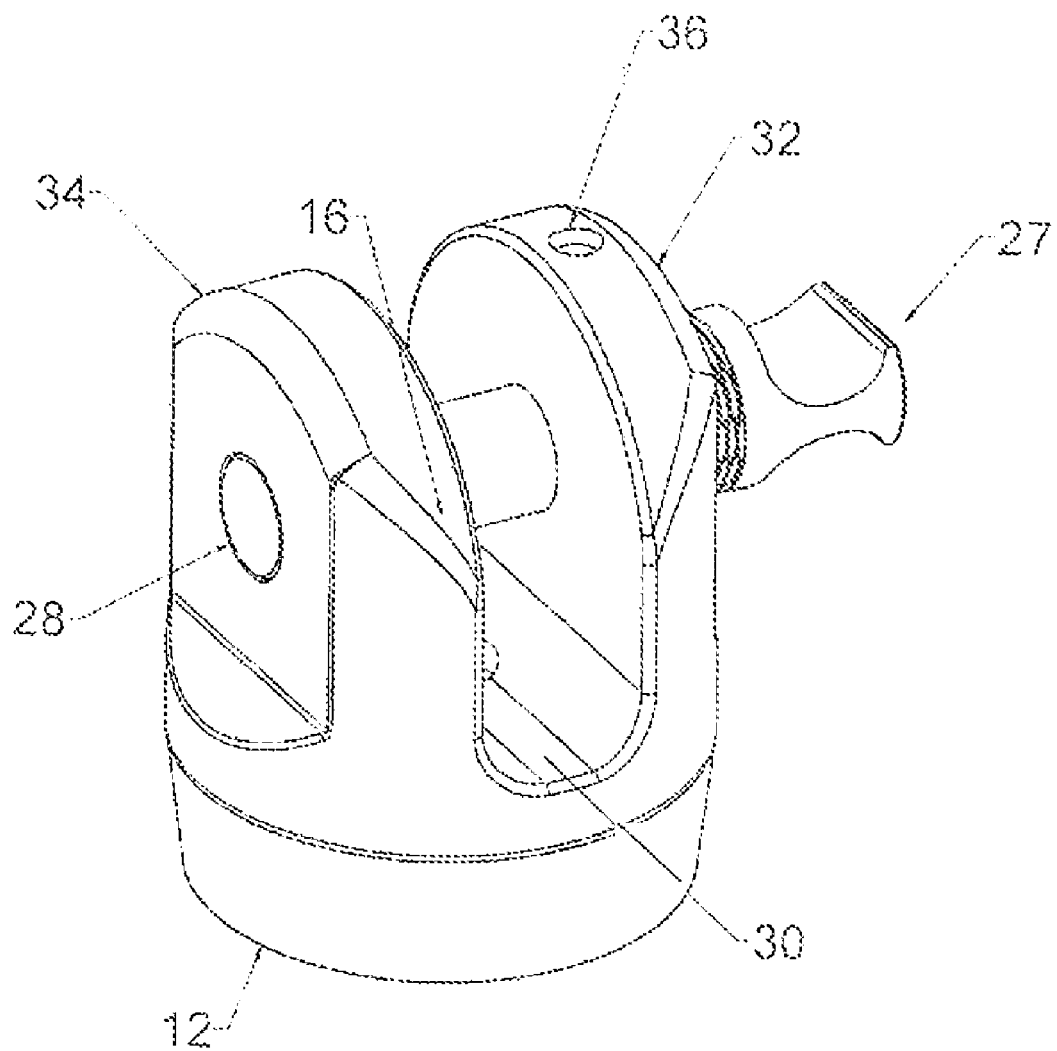
FIG. 4 is a perspective view, showing an embodiment of the present invention, showing an anchor including a clevis joint with an open span closed by a load pin.

The invention may be adapted to a wide variety of load-bearing components. FIG. 4 shows an anchor 12 including the inventive features. The anchor includes a well known clevis joint. The clevis joint includes inner clevis half 32, outer clevis half 34, and open space 30 lying between the inner and outer clevis halves. Load pin 16 selectively bridges the open span.

Figure 5:
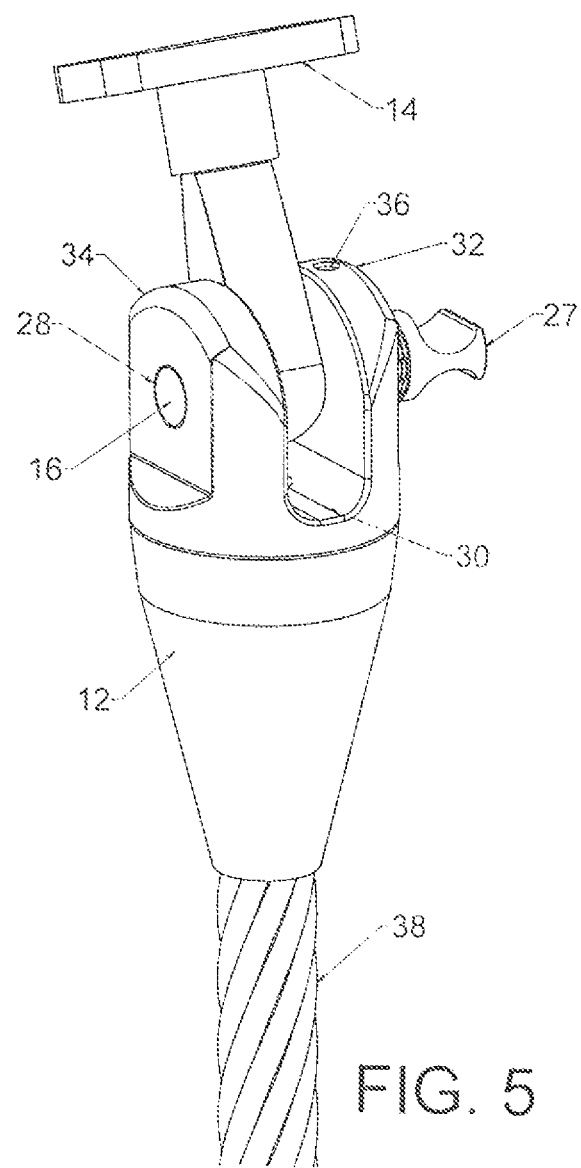
FIG. 5 is a perspective view, showing the anchor of FIG. 4 joined to a cable using a load pin.

FIG. 5 shows one example of a load-bearing connection using anchor 12. In this example, loading component 14 is an eye connected to a plate. The plate may be welded or bolted to a stationary structure that cable 38 needs to be attached to. The loading component includes a transverse hole that can be aligned with transverse hole 28 through the inner and outer clevis halves. In this example, anchor 12 is connected to cable 38. Load pin 16 is passed through the transverse hole in inner clevis half 32, through the hole in loading component 14, and through transverse hole 28 through outer clevis half 34. Once the load pin is secured, a strong connection is established between cable 38 and loading component 14.

A loading component is anything that is used to transfer a load to anchor 12. The load may be a tensile load, a compressive load, a torsional load, or any combination of these (though obviously a compressive load could not be transmitted to a flexible cable).

Anchor 12 itself may be attached to many different things. For example, it may be attached to a cable as shown or welded to a solid structure. Where compressive loads must be transferred, the anchor may be rigidly connected to a solid rod. Probably the most common application involves anchor 12 being attached to a cable.

Returning now to FIG. 4, the reader will observe how load pin 16 extends across open span 30 and into outer clevis half 34. As for prior art clevis joints, the pin is preferably configured to transmit load evenly between the two halves of the clevis. Handle 27 is preferably provided on at least one end of load pin 16 to allow a user to more easily manipulate the pin. The handle preferably provides a suitable gripping surface so that the user may easily push, pull, and rotate load pin 16.

Set screw receiver 36 allows a set screw to be added through the top of inner clevis half 32. A set screw placed in this set screw receiver is an important component of the locking feature in this particular embodiment. This set screw interacts with a slot provided in the load pin. FIGS. 6-9 illustrate these components and how they interact.

Figure 6:
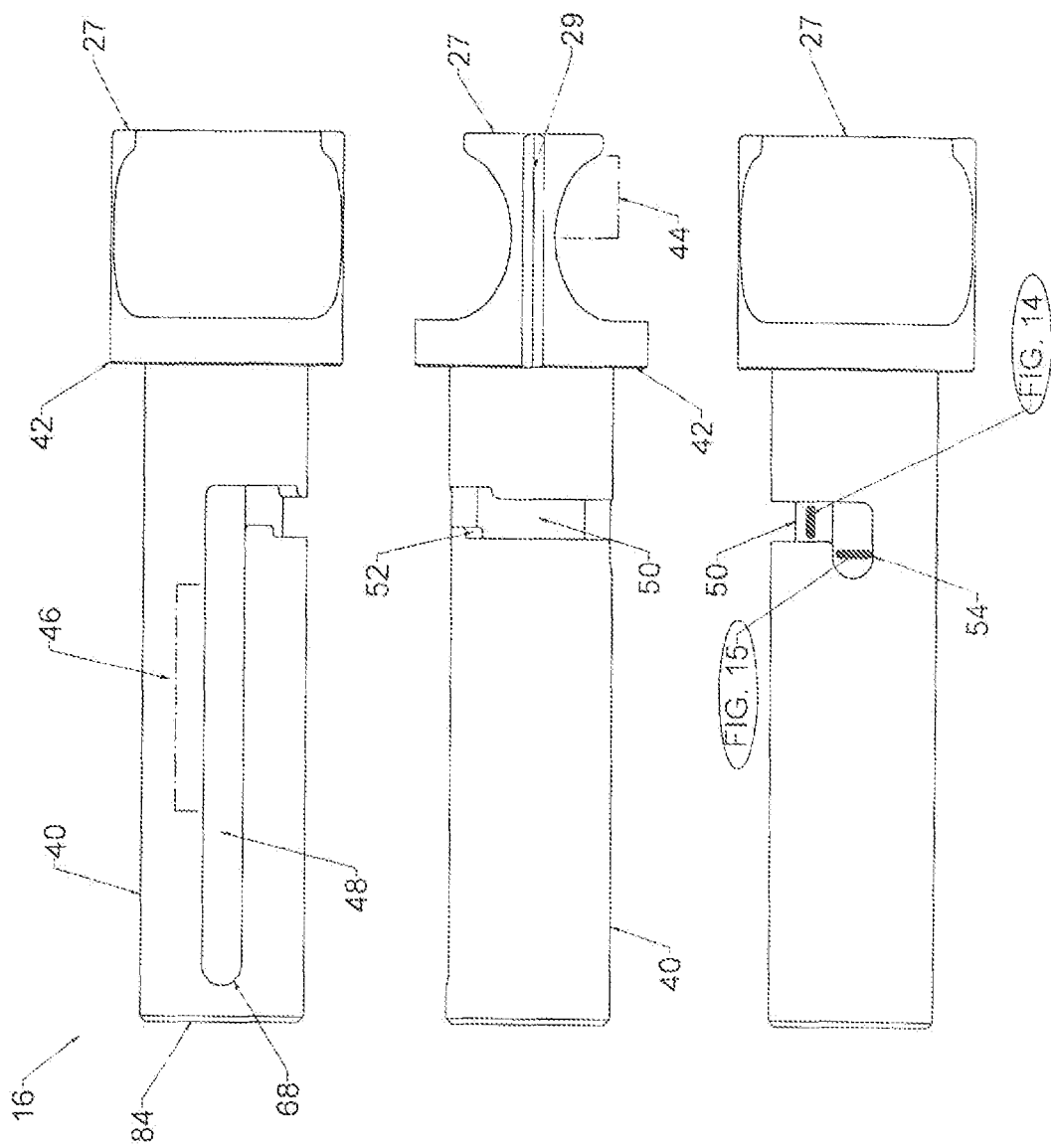
FIG. 6 shows several views of a load pin made according to the present invention.

FIG. 6 presents three views of load pin 16. These views are orthographic projections of each other. The uppermost view is a top view of the load pin. The central view is a side view. The bottom view is a bottom view. The load pin has two major components. These are shaft 40 and handle 27. The shaft is the load-bearing component. It is inserted through the clevis joint with leading end 84 leading the way. A handle is preferably provided on the trailing end of the load pin. The handle is provided to allow a user to grip and manipulate the load pin. Handle 27 preferably includes one or more grip surfaces 44 which allow the user to more easily grasp and manipulate the load pin. Indicator groove 29 is preferably provided down one side of the handle. This provides a visual cue as to the rotational state of the load pin.

Looking at the uppermost view, the reader will note the presence of slot 46. The slot can be formed in many different ways—including simply casting or forging it in place if one of those techniques is used to create the load pin. However, for many embodiments, the slot will be created by a cutting operation. For example, an end mill that is driven along a defined centerline of the slot can be used to create the desired geometry.

The slot is formed with a specific shape, the purpose of which will be described subsequently. In the embodiment shown, forward extreme 68 of slot 46 is separated a short distance from leading end 84 of shaft 40. The interaction of the slot with other components will first be described on a basic level. An explanation will then be provided for each specific segment of the slot's differing geometry.

Figure 8:
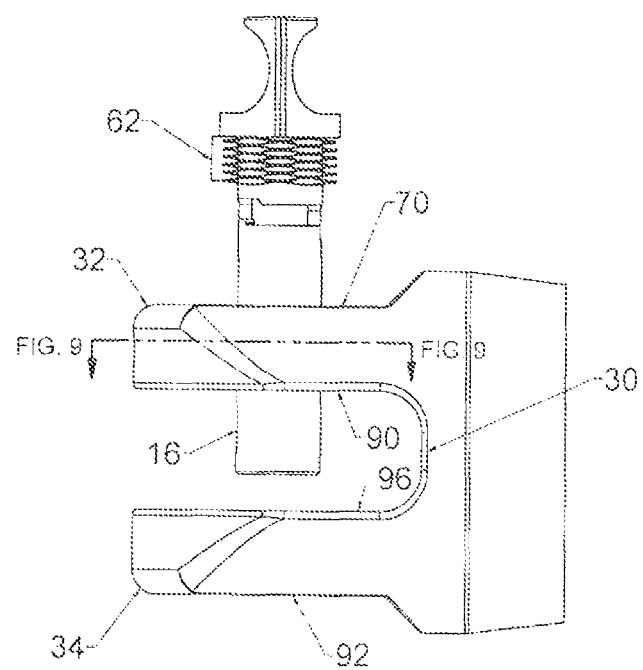
FIG. 8 is an elevation view, showing the anchor of FIG. 4 with the load pin pulled partially free of the open span.

On a basic level, the slot is configured to interact with a fixed pin located somewhere on the clevis joint. FIG. 8 shows how this interaction may be created. In FIG. 8, load pin 16 has been advanced through inner clevis half 32 and partway across open span 30. A section view through inner clevis half 32 and load pin 16 is called out in FIG. 8. The section view that is called out is shown in FIG. 9.

Figure 9:
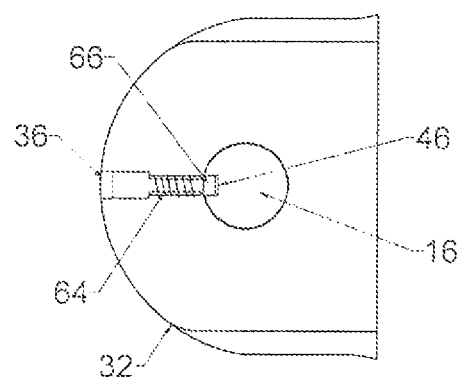
FIG. 9 is a sectional view called out in FIG. 8, showing how the slot pin interacts with the slot in the load pin.

FIG. 9 is a partial section view that only shows the geometry lying near load pin 16. Set screw receiver 36 is an open passage extending from the top of inner clevis half 32 down into transverse passage 28. Set screw 60 is configured to be threaded into female thread 64. When this is done, slot pin 66 (the end of the set screw) extends down into slot 46 in load pin 16.

The slot pin can be any device which interacts with the slot in load pin 16. It need not be attached to a set screw. It could instead be a roll pin driven into a cylindrical hole. The slot pin could even simply be a protrusion that is part of the inner clevis half.

Set screw is preferably secured within the inner clevis half, such as by using a thread-locking agent on the threads. At the same time, it is preferable to be able to remove set screw 60 if desired. Thus, it is preferable to use a reversible thread locking agent rather than an adhesive.

The slot pin may be located in areas other than the upper portion of the inner clevis half. It could be located instead on the lateral or bottom portions. One could also locate the slot pin on the outer clevis half in some embodiments.

In FIG. 9, the reader will observe how slot pin 66 extends into slot 46 and creates a close sliding fit. In the arrangement shown, it is readily apparent that the user will be able to slide the load pin in and out of the clevis joint but will not be able to rotate the load pin. Thus, the interaction of slot pin 66 and slot 46 constrains the motion of load pin 16.

Returning now to FIGS. 6 and 7, more details of the slot will be explained. In the embodiment of FIG. 6, the slot has four joined components. These are: (1) Longitudinal portion 48, (2) jogging portion 52, (3) rotational portion 50, and (4) locking portion 54. Because the slot in this example extends around 180 degrees of shaft 40, not all portions are visible in a single view.

Longitudinal portion 48 is easily viewed in the uppermost view of FIG. 6. Some "directional" terms are helpful in understanding these components. Returning to FIG. 4, one may visualize anchor 12 as sitting on a horizontal surface. The operation of the device will be described with reference to this orientation, so that terms like "top" and "bottom" will make sense. However, the reader should bear in mind that the orientation of the anchor and the other hardware is wholly arbitrary, and that the use of "directional" terms should not be viewed as limiting.

Returning now to FIG. 6, the uppermost view is looking at the "top" of the locking pin (with respect to the orientation of the locking pin shown in FIG. 4). In this example, the locking pin is ordinarily inserted with longitudinal portion 48 facing upward, since this makes it easy to screw in the set screw so that the slot pin finds the slot. Of course, a user can add the set screw in many other orientations, as long as the slot pin aligns with a portion of the slot.

Jogging portion 52 connects longitudinal portion 48 to rotational portion 50 (best seen in the middle view). Rotational portion 50 preferably extends around 180 degrees of shaft 40 and joins locking portion 54 (best seen in the bottom view). Other embodiments may extend rotational portion 50 more or less than 180 degrees.

Figure 7:
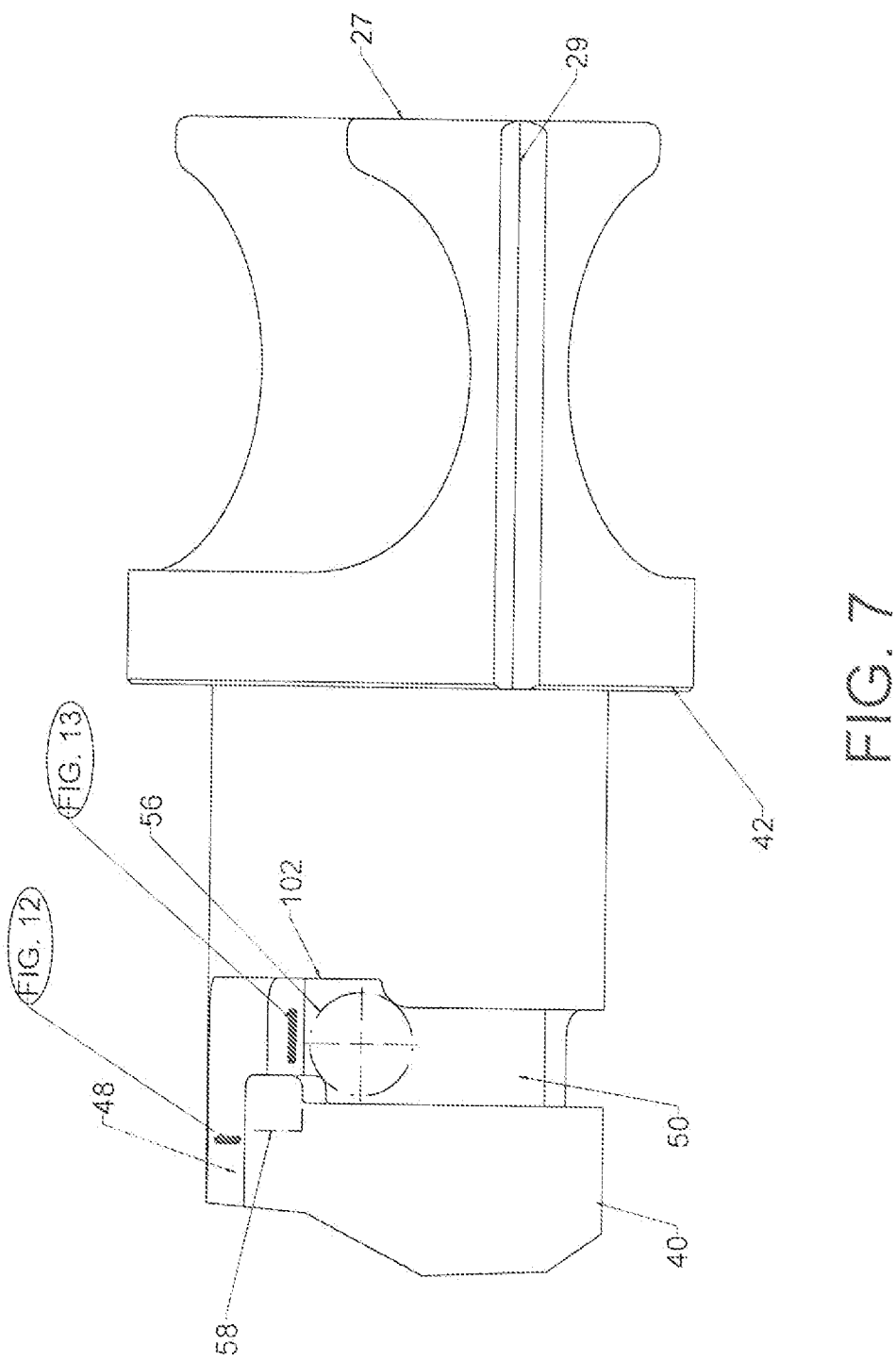
FIG. 7 is a detailed perspective view, showing some details of the slot in the cylindrical portion of the load pin.

FIG. 7 shows an enlarged view of jogging portion 52. It would be possible to directly join longitudinal portion 48 to rotational portion 50. However, jog 56 may be placed in between. The slot is preferably defined by a fixed (or relatively fixed) cross section swept along a defined centerline. This centerline jogs as shown in FIG. 7. The result is the creation of rearward protrusion 58. The reader will recall that slot pin 66 "rides" in the slot. Thus, in order to transition the slot pin from longitudinal portion 48 to rotational portion 50, the user must manipulate load pin 16 so that slot pin 66 passes around rearward protrusion 58 before the slot pin can enter rotational portion 50.

Rearward protrusion 58 may assume many different forms and may be placed in different locations along the slot. Multiple instances of such a protrusion may also be included.

FIG. 7 also provides a good view of shoulder 42. This is an area of increasing diameter. In the example illustrated, shoulder 42 is located where the shaft joins the handle. The shoulder may be used to compress a wave spring (not shown in FIG. 7) in a manner that will be described subsequently. Although the slot geometry seems somewhat complex, it is easy to understand when considered in the context of assembling and operating the invention (as will be explained subsequently).

FIG. 8 shows load pin 16 in an intermediate position. The reader will observe the presence of wave spring 62. Those skilled in the art will know that wave springs are essentially a substitute for helical or other compression springs. When compared to a helical spring, a wave spring provides a higher force over a shorter compression "stroke," and a non-linear force curve. The use of a wave spring is by no means essential to the present invention, but they are considered advantageous in many embodiments. The wave spring has an inner passage sized to allow the wave spring to slide smoothly over the generally cylindrical shaft of the load pin. The wave spring's compression coefficient is preferably selected to provide sufficient stiffness to achieve the desired retention function, while allowing an operator to manipulate the device without heavy tools.

FIG. 8 presents a standardized nomenclature that is useful in considering clevis joints. A load pin is generally inserted into a clevis joint in only one direction. During this insertion process, the first clevis half it passes through is called the "inner clevis half" (inner clevis half 32) while the second clevis half it passes through is called the "outer clevis half" (outer clevis half 34). The surfaces of each clevis half are also named. These are: first outward facing surface 70, first inward facing surface 90, second inward facing surface 96, and second outward facing surface 92.

It is possible for some embodiments of the present invention to be bidirectional: that is, these embodiments allow the load pin to be inserted from either side of the clevis joint. The nomenclature provided depends upon the direction from which the clevis pin is inserted. Thus, for those embodiments allowing insertion from either side, the identification of the surfaces will depend upon the direction of insertion that the user selects. The "first outward facing surface" identified for one direction of insertion becomes the "second outward facing surface" when the opposite direction of insertion is selected.

The reader will observe that if load pin 16 is pushed from right to left in the orientation of FIG. 8, shoulder 42 of handle 27 will eventually compress wave spring 62 between itself and first outward facing surface 70. This compression is significant to the operation of the locking mechanism—as will be explained.

Figure 10:
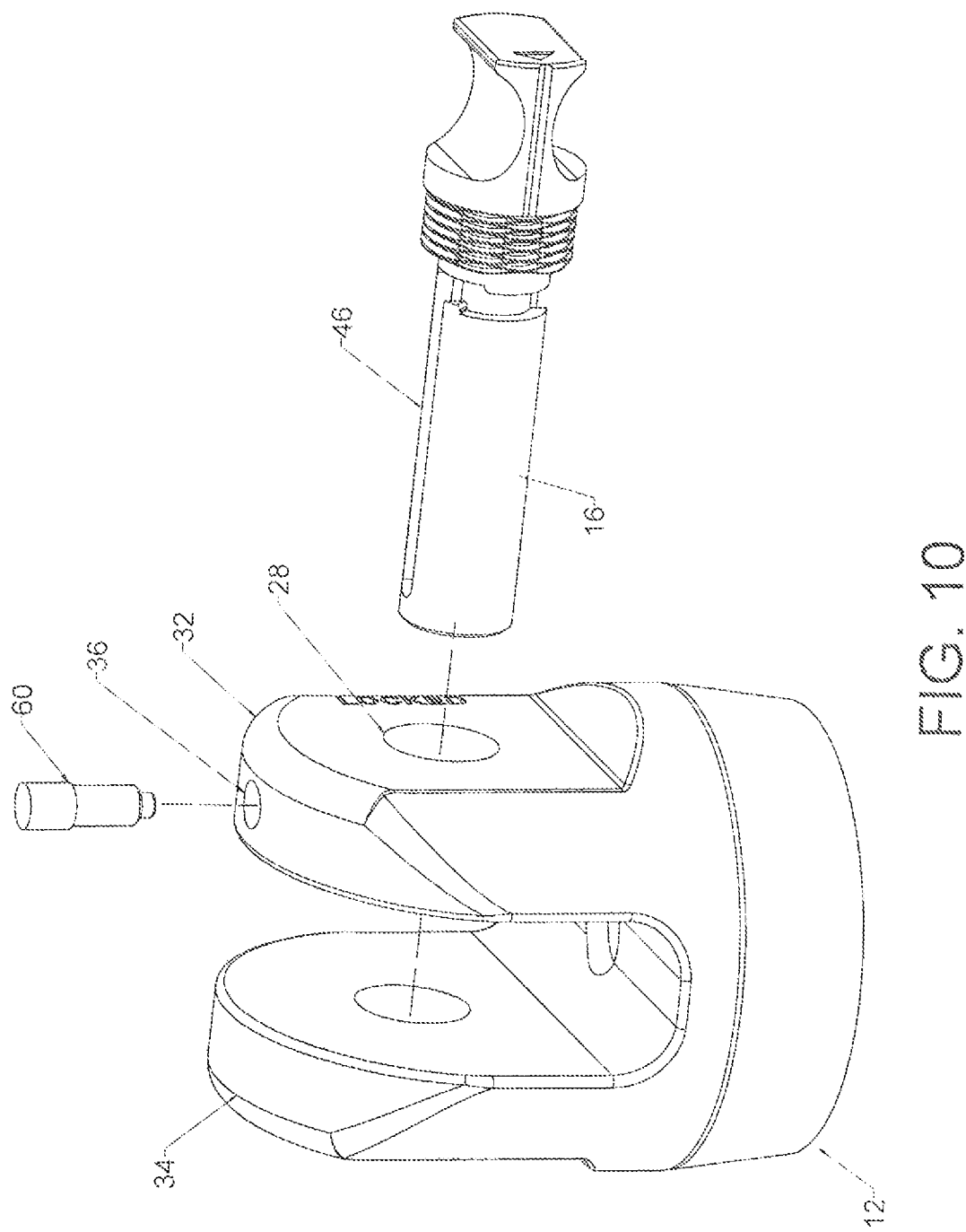
FIG. 10 is an exploded perspective view, showing the components of the embodiment of FIG. 4 in an exploded state.

The process of assembling and operating one embodiment of the invention (that of FIGS. 4-15) will now be provided. FIG. 10 shows the invention in an exploded state. Set screw 60 is not installed initially (or is not screwed down to the point its slot pin extends into transverse hole 28). Load pin 16 may be freely introduced into transverse hole 28 (with wave spring 62 slipped over the shaft as shown). The load pin 16 is turned until longitudinal portion 48 of slot 46 faces directly upward. Set screw 60 is then tightened until its slot pin 66 protrudes into longitudinal portion 48.

Once the set screw is in place, load pin 16 may be manipulated through several constrained motions. However, in this embodiment, it cannot be removed from the clevis joint. This fact is made apparent by studying FIG. 6. The reader will observe that slot 46 never exits shaft 40. The slot ends at forward extreme 68 (near leading end 84) and locking portion 54 (visible in the lowest view). If one wishes to make a different embodiment in which the load pin is removable, one need only carry slot 46 out the leading end of the load pin.

Figure 11:
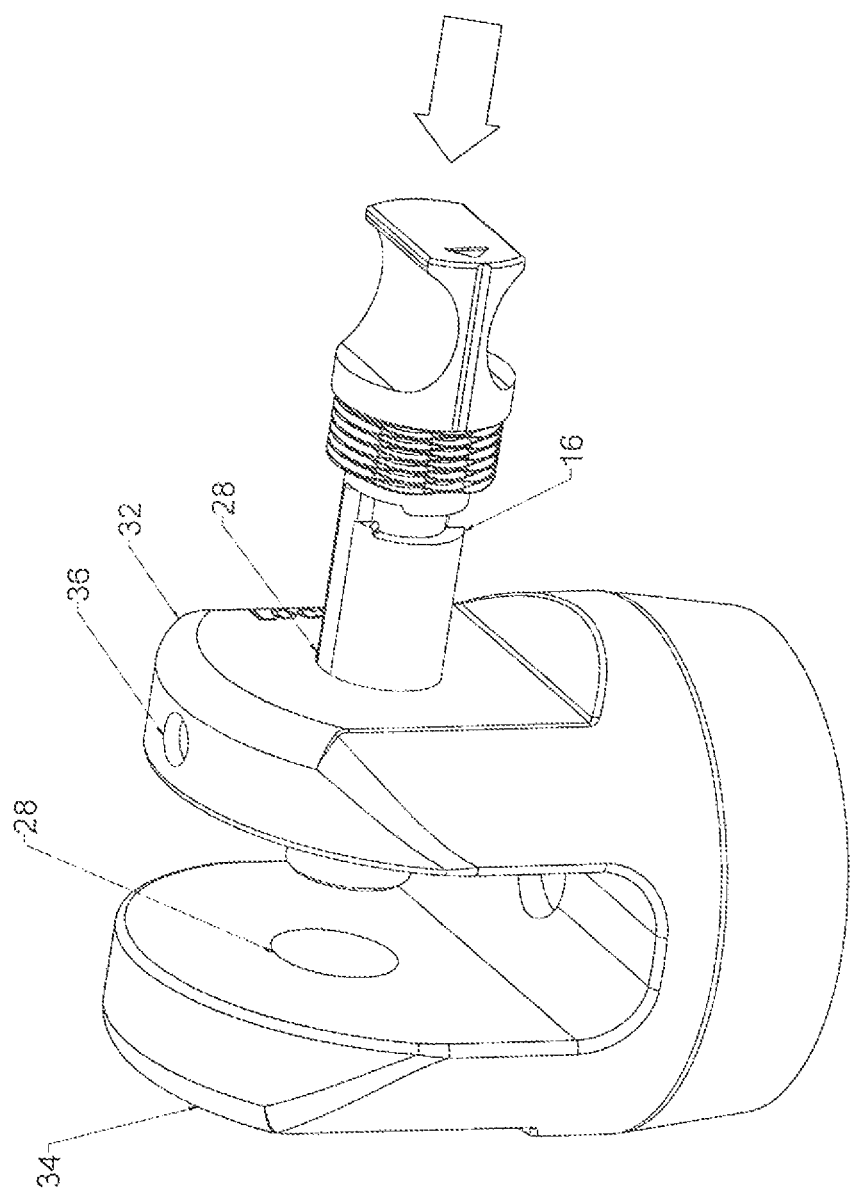
FIG. 11 is a perspective view of the embodiment of FIG. 4, showing the load pin being advanced across the open span.
Figure 12:
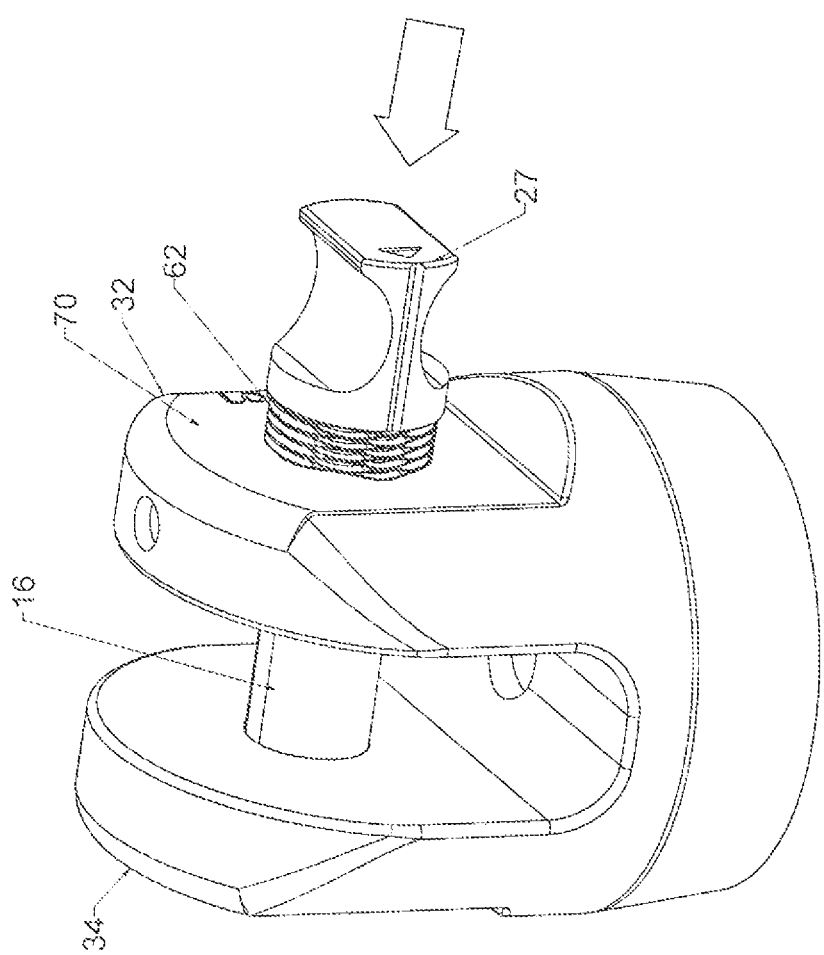
FIG. 12 is a perspective view, showing the assembly of FIG. 11 with the load pin having closed the open span.

FIG. 11 shows load pin 16 after it has been installed in the clevis and the set screw has been tightened. The user "closes" the open clevis by pushing load pin 16 inward as indicated by the arrow. The load pin freely slides inward—with slot pin 66 riding along in the slot. FIG. 12 shows the continuation of the installation process. Load pin 16 has been pushed further into transverse hole 28 until the leading portion of wave spring 62 presses against first outward facing surface 70. In order for the user to press the load pin further into the joint (the direction indicated by the arrow) wave spring 62 must be compressed. The wave spring is preferably selected to be fairly stiff. Thus, in order to create further inward motion, the user must press firmly inward on handle 27.

In order to understand the operation of the slot in the load pin, it is desirable to flip back and forth between the drawings depicting the load pin (FIGS. 6 and 7) and the drawings depicting the insertion and locking process. FIG. 12 shows the position of load pin 16 just as wave spring 62 is beginning to be compressed. This position of the slot pin in the slot at this point is indicated in FIG. 7. The balloon indicating the "FIG. 12" position in FIG. 7 is near the trailing end of longitudinal portion 48. This indicates the position of slot pin 66 at the time of the configuration of FIG. 12. The reader will note that at this point slot pin 66 is still constrained within longitudinal portion 48 and it is not possible to rotate the load pin. The load pin is not locked in place because it is still possible to freely slide it in and out of the clevis joint.

Figure 13:
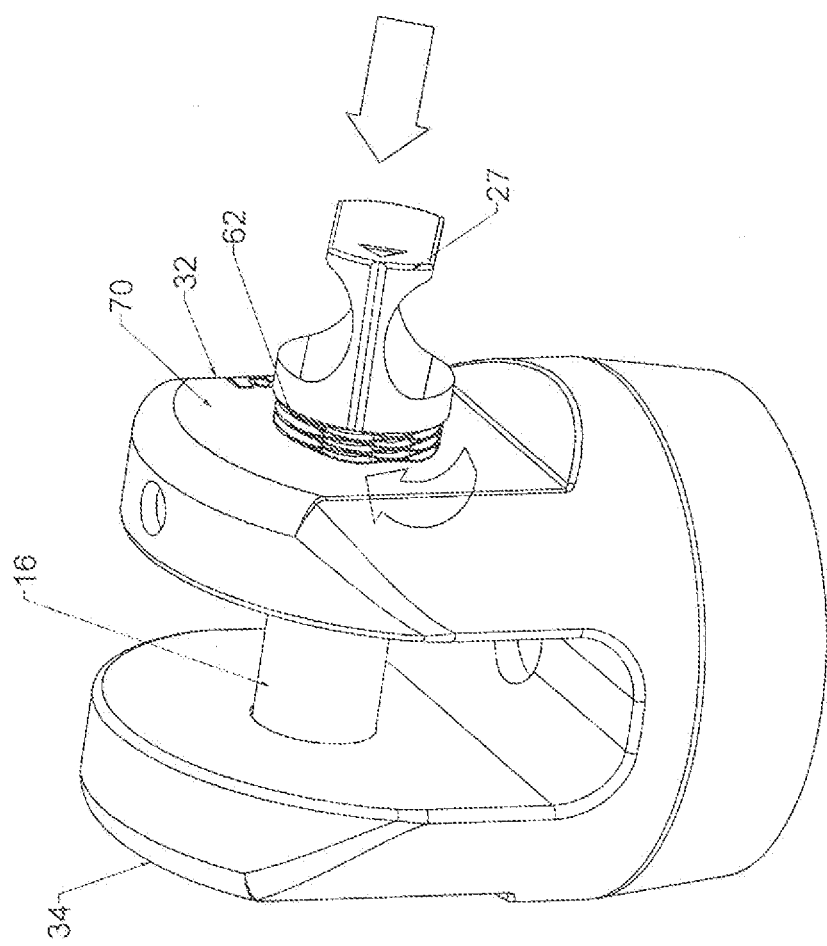
FIG. 13 is a perspective view, showing the assembly of FIG. 11 with the load pin being turned to begin the locking cycle.

In order to actuate the locking feature, the user must take additional action. Still looking at FIG. 7, the hash mark calling out the slot pin location corresponding to FIG. 12 is the point where the wave spring just begins to be compressed. In order to rotate the load pin, the user needs to move the slot pin around rearward protrusion 58 so that it can enter rotational portion 50. In order to do this, the user pushes the load pin further into the clevis joint—against the resisting force of the wave spring. Slot pin 66 will then come to rest against back wall 102. The user can then rotate the load pin while maintaining the forward pressure. This action is shown in FIG. 13. The user maintains the inward pressure while rotating handle 27 in the direction shown. The position that slot pin 66 occupies at this point is indicated in FIG. 7.

Those skilled in the art will realize that if the user continues to rotate handle 27 in a clockwise direction the slot pin will pass through jog 56 and into rotational portion 50. When this happens, the user will perceive it via handle 27 popping out slightly and then becoming easier to turn. While the slot pin rests in rotational portion 50 the handle may be used to turn the load pin. However, the reader will note that the wave spring remains somewhat compressed while the slot pin lies in rotational portion 50. This compression helps prevent any unwanted rotation. In other words, while the user is able to grasp the handle and rotate the load pin without undue exertion, the load pin is not likely to rotate on its own.

Figure 14:
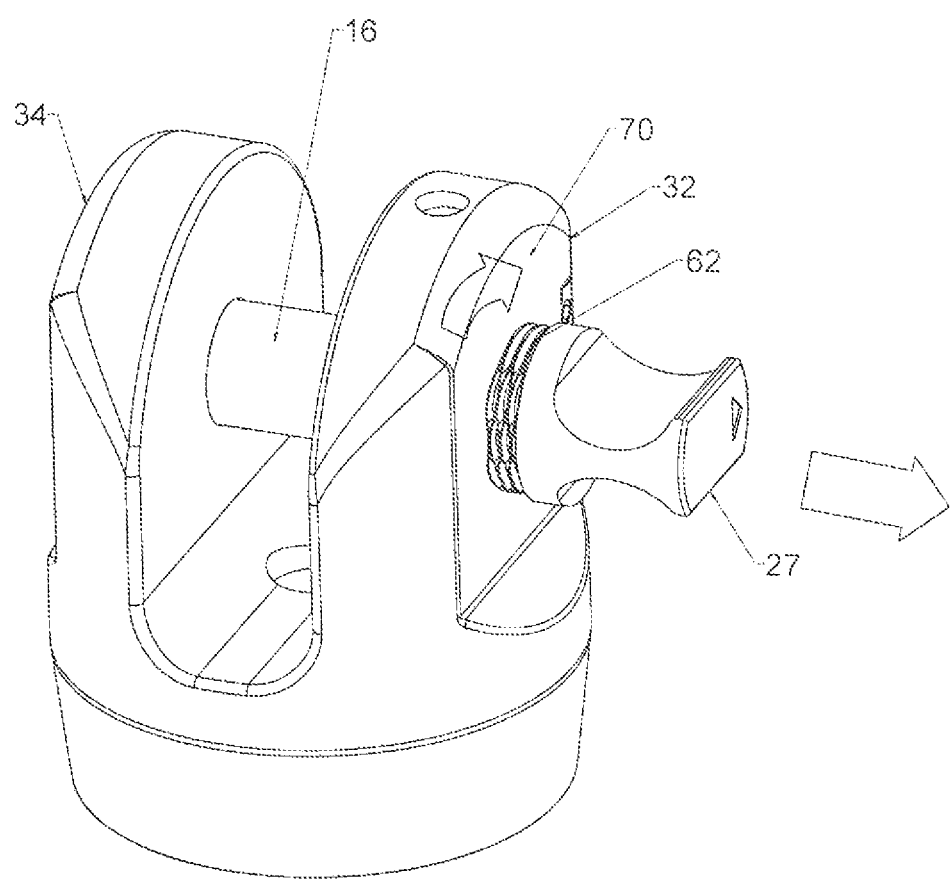
FIG. 14 is a perspective view, showing the assembly of FIG. 11 with the load pin being turned to complete the locking cycle.

Instead, the user must positively grasp the handle and rotate the load pin through a significant arc. In the embodiment of FIGS. 4-15, the required rotation is 180 degrees. This rotation is shown in FIG. 14. At the point shown, handle 27 has been rotated through nearly 180 degrees. The final few degrees of rotation transition load pin 16 to its locked position.

Figure 15:
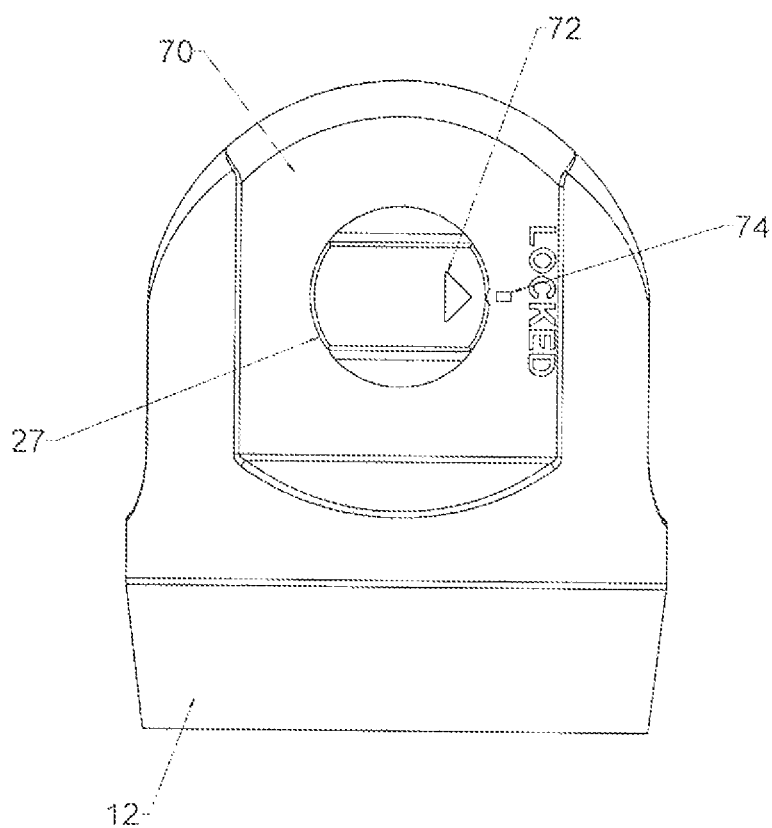
FIG. 15 is an elevation view, showing the assembly of FIG. 11 with the load pin in the locked position.

This transition is shown in the bottom view of FIG. 6. The position of slot pin 66 in the configuration of FIG. 14 and FIG. 15 is called out in this view. In FIG. 14, slot pin 66 is just about to move from rotational portion 50 to locking portion 54. As soon as this final bit of rotation is made, the user will feel handle 27 pop out as the compressed wave spring relaxes and slot pin 66 feeds into locking portion 54. Once the slot pin is resting in locking portion 54, rotation of the load pin is again restricted. And, the wave spring compression holds the slot pin in locking portion 54 and prevents unintended unlocking. The wave spring may actually be completely relaxed while the slot pin is in locking portion 54. However, the wave spring must be compressed in order for the slot pin to exit the locking portion.

FIG. 15 shows an elevation view of the handle and anchor in the locked state. Marker 72 is preferably provided on a visible portion of handle 27. Locked position reference 74 is preferably provided on first outward facing surface 70 so that the user may easily verify that the correct degree of rotation has been completed and the device is locked. A text or symbolic indicator may also be added. Of course, once the user has operated the device a few times he or she will perceive the locked state by the fact that the handle pops out and is no longer free to rotate.

The locking procedure has been illustrated without any loading component being placed in open span 30. In actual use of course, a loading component 14 such as shown in FIG. 5 would be placed in open span 30 before the locking process is initiated. Even with set screw 60 in place, load pin 16 can be pulled nearly or completely free of open span 30. In looking at the upper view of FIG. 6, the reader will again note that forward extreme 68 of slot 46 lies close to leading end 84. This lets the load pin slide outward until only its tip remains within inner clevis half 32 and no portion of the load pin extends into open span 30.

With the open span thus clear, loading component 14 may be placed therein as shown in FIG. 5. The reader will recall that loading component 14 has a transverse hole that may easily be aligned with transverse hole 28 through the clevis joint. Once these are aligned, the user presses load pin 16 inward and completes the locking process as described previously.

When making such a connection a user is often trying to hold the weight of the anchor or loading component while manipulating the pin. An advantage of the embodiment just described is the fact that the loading pin remains attached to the anchor even when in the "open" state. The user can maintain inward pressure on handle 27 while jockeying the holes into alignment. Once the load pin is advanced into the outer clevis half, the connection is made and the user is then free to reposition (if needed) to perform the actions needed for the locking step.

The process of disconnecting the device is the opposite of the steps just described. The user starts with the configuration shown in FIG. 15. The user must press handle 27 inward until slot pin 66 reaches the intersection between locking portion 54 and rotational portion 50. The user then rotates the handle in a counterclockwise direction for about 160 degrees. At this point, slot pin 66 comes up against rearward protrusion 58 shown in FIG. 7.

It is preferable to make the angle of jog 56 steep enough so that rearward protrusion 58 has a fairly steep shoulder where it joins rotational portion 50. The steepness of this shoulder means that the user cannot easily "overcome" the rearward protrusion by simply applying more counterclockwise torque to handle 27. Instead, the user must take the positive step of pushing handle 27 in while continuing to turn it in the counterclockwise direction. Slot pin 66 will then pass through jogging portion 52 and then into longitudinal portion 48. The load pin at that point may be pulled free.

As explained previously, load pin 16 will be retained within inner clevis half 32 so that it is not dropped or lost. On the other hand, a user desiring to completely remove the load pin can unscrew set screw 60.

The security of the connection created by the load pin in the present invention is one of its central advantages. When the load pin is in its locked state, it cannot transition to the unlocked state without the user taking the handle (and the load pin connected thereto) through at least two separate motions. In fact, in the embodiment shown in FIGS. 4-15 the user must take the handle through three separate motions. These are: (1) Push the handle inward; (2) Rotate the handle through an arc; and (3) Push the handle inward while rotating the handle through an additional arc.

Figure 16:
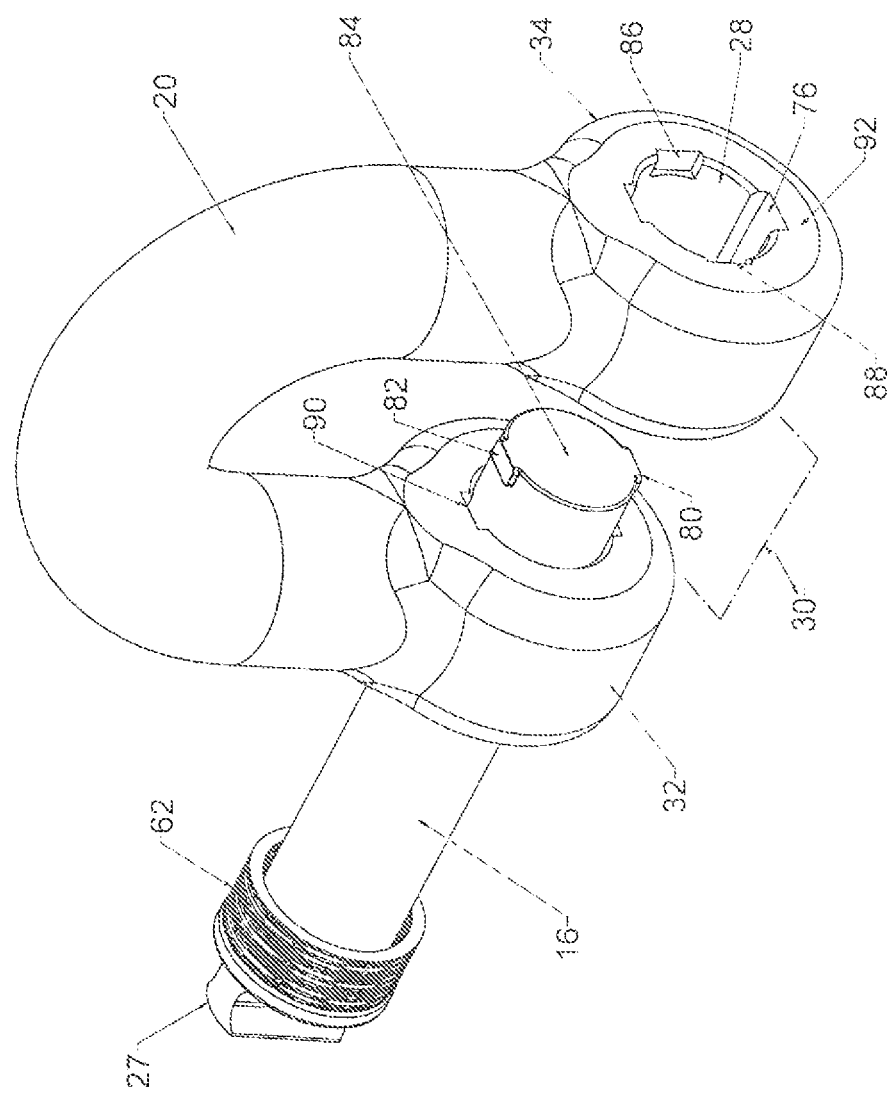
FIG. 16 is a perspective view, showing an alternate embodiment using one or more lugs as part of the locking system.
Figure 17:
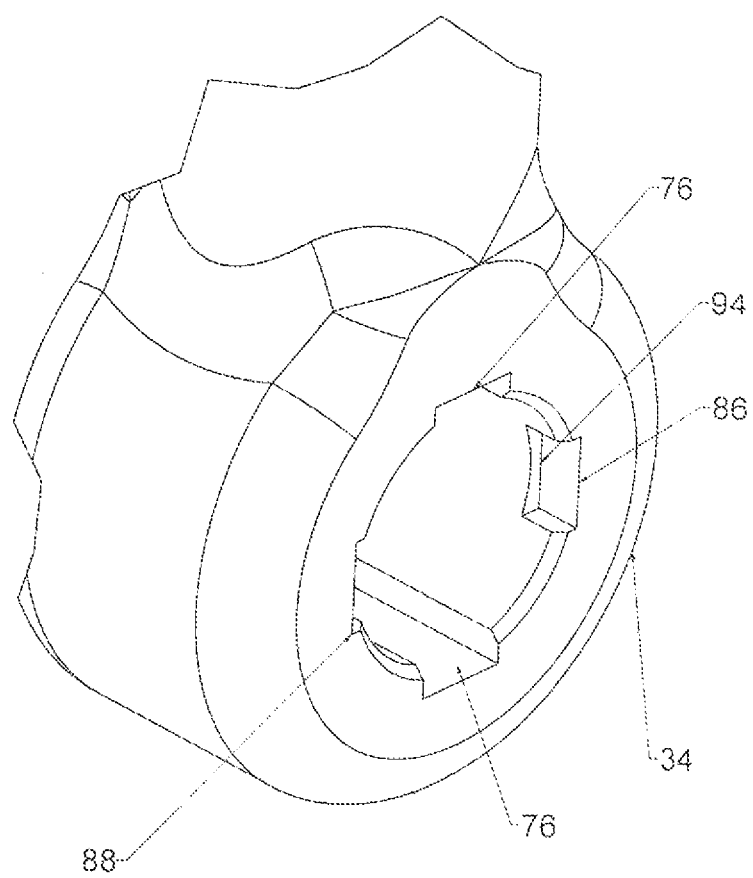
FIG. 17 is a detailed perspective view, showing some details of the passage through the outer clevis half.
Figure 18:
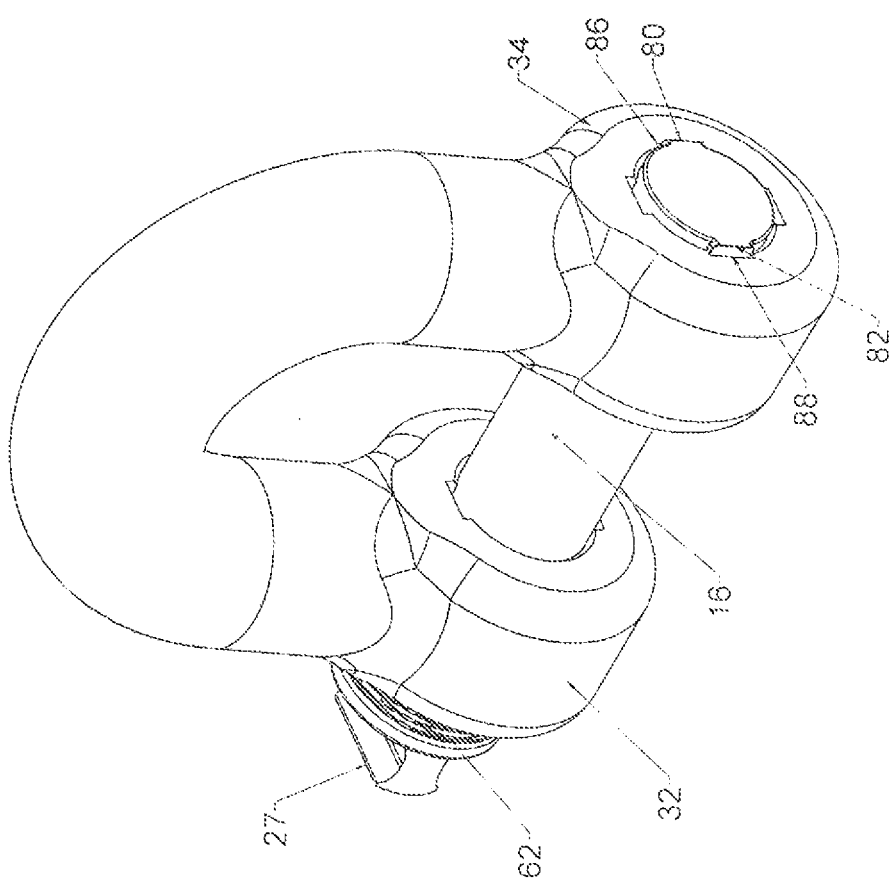
FIG. 18 is a perspective view, showing the embodiment of FIG. 16 with the load pin in the locked position.

Not all applications will require a three-motion unlocking procedure. However, it is important for an embodiment to include at least two separate motions in order to unlock the load pin. FIGS. 16-18 illustrate a second embodiment that includes only a two-motion unlocking procedure.

The embodiment of FIG. 16 shows a somewhat different type of clevis joint than the embodiment of FIGS. 4-15, but the operating principles are essentially the same. Shackle 20 has an enlarged portion at each end of its bow. The enlarged portions form inner clevis half 32 and outer clevis half 34. Open span 30 lies between the two clevis halves. As for the prior embodiment, a loading component including a transverse hole may be placed in open span 30 and connected to shackle 20 by passing load pin 16 through the inner clevis half, through the loading component, and through the outer clevis half.

In fact, the shackle of FIG. 16 can be equipped with the exact same type of locking components as found in the embodiment of FIGS. 4 through 15. However, the actual shackle embodiment of FIG. 15 includes a somewhat different system.

Rather than using a pin mounted on the clevis joint interacting with a groove in the load pin, the embodiment of FIG. 15 uses a pin mounted on the loading pin interacting with a groove in the clevis joint. The "pin" on the load pin assumes the form of two lugs—first lug 80 and second lug 82. These may be formed integral with the load pin itself—such as in a forging operation—or they may be separate components that are added to the load pin.

Transverse hole 28 passes through both halves of the clevis joint. Load pin 16 is sized to be a smooth sliding fit within the transverse hole. First keyway 76 and separate keyway 78 also carry completely through both halves of the clevis joint. The two keyways are sized and located to allow the passage of the two lugs. Thus, once a user aligns the two lugs with the two keyways, load pin 16 is free to slide in and out of the clevis joint. It is also possible to use a single lug sliding in a single key way. However, the use of two lugs is preferred.

Load pin 16 has a smooth cylindrical exterior, except for the two lugs. It includes handle 27 as for the prior embodiment. Wave spring 62 is sized to be a smooth sliding fit over the exterior of the load pin and to bear against the shoulder of handle 27—again as for the prior example.

In the example of FIG. 16, the clevis joint is configured to receive a load pin sliding into the joint from left to right. At or just before the point where leading end 84 of load pin 16 lies flush with second outward facing surface 92, wave spring 62 begins to be compressed between handle 27 and the first outward facing surface of inner clevis half 32 (which faces away from the viewer in FIG. 16 and is not visible). The fact that the two lugs 80, 82 are sliding within the two keyways 76, 78 means that load pin 16 is unable to turn.

In order to use the locking feature, the user must push inward on handle 27 until the trailing portion of the two lugs 80, 82 move beyond second outward facing surface 92. Once the lugs are clear, load pin 16 is free to rotate. The user then rotates the load pin so that the lugs are no longer aligned with the keyways. Wave spring 62 is at this point considerably compressed. Thus, the trailing portion of each lug is forced back against second outward facing surface 92. The wave spring is preferably selected so that the friction between the trailing portion of the lugs and second outward mating surface 92 prevents rotation of the load pin, other than when the user grasps the handle and affirmatively applies a turning torque.

As the user continues turning the handle, the two lugs 80, 82 will eventually be aligned with first pocket 86 and second pocket 88. The pressure exerted by the wave spring urges the load pin to the left in the orientation shown in FIG. 16. Thus, once the two lugs align with the two pockets, the two lugs will drop into the pockets and the load pin will move to the left in the view.

FIG. 17 shows outer clevis 34 in more detail. The reader will observe that each pocket only extends part way into the transverse hole passing through the outer clevis. Each pocket terminates in a pocket mating surface 94. The trailing portion of each lug comes to rest against a pocket mating surface 94 and this arrests further motion of the load pin.

FIG. 18 shows this state. In this view, the two lugs have fallen into the two pockets. The geometry of the lugs and pockets are preferably configured so that the leading portion of load pin 16 lies approximately flush with second outward facing surface 92 in the state depicted. Multiple sets of pockets may optionally be provided. For example, three sets of pockets could be provided, spaced evenly around the perimeter of the transverse hole.

Wave spring 62 is sized so that it is still mildly compressed when the lugs are stationary within the two pockets. The load pin is thereby locked in position. It will not come loose without the user deliberately grasping the handle and manipulating the load pin through two motions. First, the user must press in on handle 27 until the two lugs travel completely out of the two pockets. Next, the user must rotate the handle until the two lugs fall into the two keyways 76, 78. The load pin is at that point unlocked and the user may pull it out of the clevis joint.

Alignment markings may be provided to aid the user in manipulating the device correctly. On the other hand, once the user is familiar with the operation of the device he or she may easily manipulate it via feel. For example, in unlocking the device, the user may push inward on the handle while simultaneously exerting a rotating torque. The user will know when the lugs clear the pockets because the load pin will start to rotate.

The pockets shown have orthogonal sides. It is also possible to provide pockets having ramped or cammed sides. These will make it easier to unlock the device, though they may also provide less security.

Once the lugs are clear and the load pin has rotated through a few degrees, the user can relax the inward pressure and just continue exerting the rotating torque. The load pin will continue to rotate until the lugs align with the keyways. The force exerted by wave spring 62 will then urge the lugs into the keyways. The user will fed this as the handle popping outward. The user will also note that the load pin is no longer free to rotate. The user thereby knows that the load pin is unlocked and that it may be pulled free.

In the embodiment of FIG. 16, load pin 16 may be pulled completely out of the clevis joint. Keyways 76, 78 pass completely through the clevis halves. Once the lugs are in the keyways, nothing prevents the removal of load pin 16. On the other hand, it is also possible to provide a retaining feature that prevents the unintended removal of the load pin. As an example, a retaining pin or screw could be provided to limit the outward travel of the lugs within the keyways.

Figure 20:
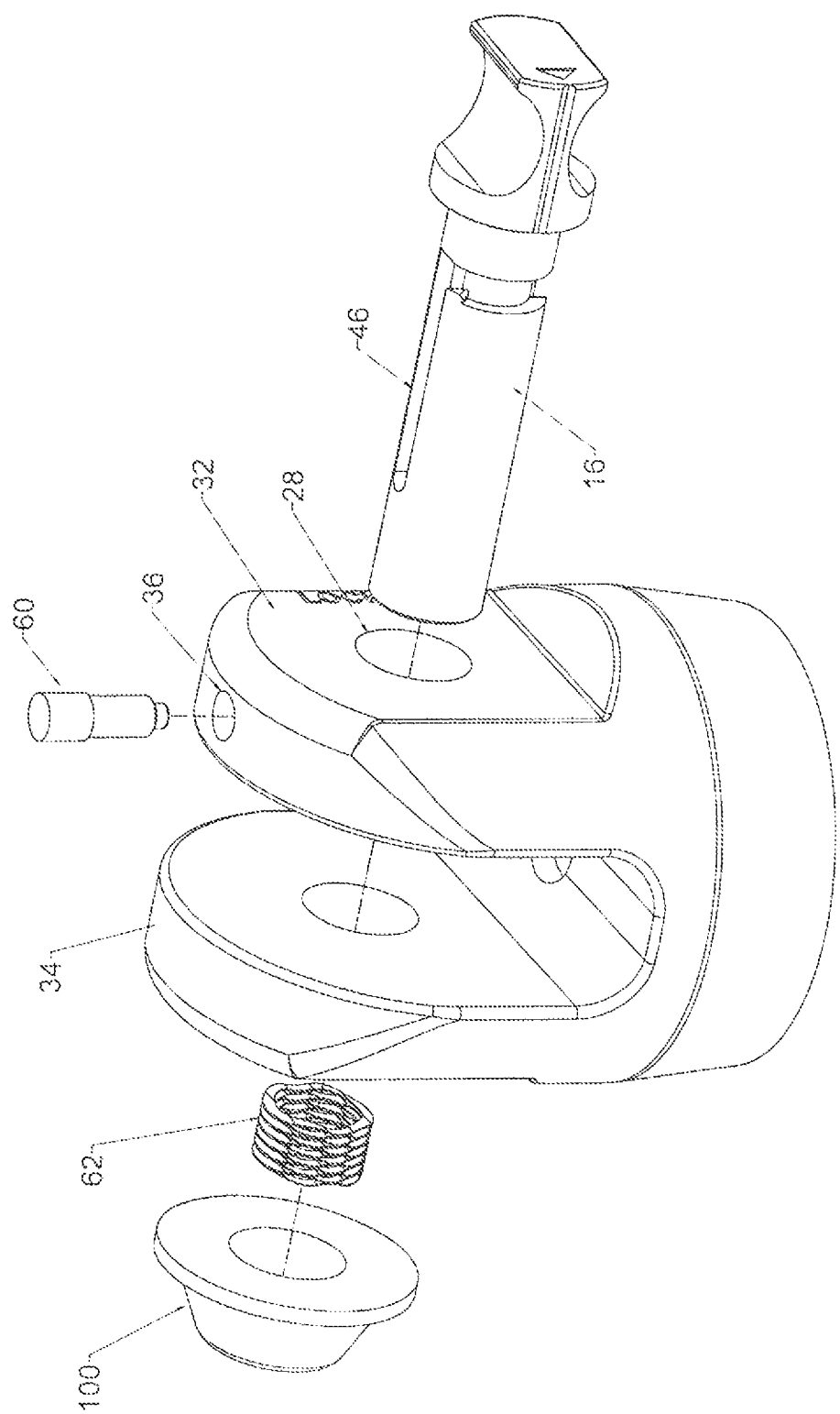
FIG. 20 is an exploded perspective view, showing an alternate embodiment for the location of the spring used to bias the locking mechanism.

Those skilled in the art will know that many variations to the features thus far presented are possible. FIGS. 19 and 20 present two such variations. In FIG. 19, a pair of cap screws screwed into blind, threaded holes are used to create the lugs 80, 82. First pocket 86 and second pocket 88 are also created in a different way. Rather than having a square forward projection, the two pockets include rounded side walls of the type that result when an end mill is used to cut the pockets (with the end mill being fed in from the direction of second outward facing surface 92. There are many other ways to create the lugs and pockets.

The reader will recall that most conceivable embodiments can be configured so that the load pin is either removable or non-removable. FIG. 19 is a good example of this convertibility. If a removable load pin is desired, first keyway 76 and second keyway 78 are provided in both the inner clevis half and the outer clevis half. If a non-removable configuration is desired, then the key ways are only provided in the outer clevis half. Load pin 16 is then passed through the inner clevis half before first lug 80 and second lug 82 are installed in the load pin.

It is preferable for substantially all of open span 30 to be unobstructed when the load pin is in the unlocked position. If key ways are not provided in the inner clevis half, it is preferable to provide pockets in first inward facing surface 90 that are analogous to pockets 86, 88 in second outward facing surface 92.

FIG. 20 shows an alternate embodiment in which the spring has been relocated. The invention needs a spring that tends to urge the load pin out of the clevis joint. The location of the spring is somewhat arbitrary. In the embodiment of FIG. 20, wave spring 62 is connected to the clevis joint rather than the load pin. Spring retainer 100 contains wave spring 62 and attaches to second outward facing surface 92. The spring is preferably retained within the spring retainer in a way that does not allow it to fall out. When load pin 16 is fed into the clevis joint, the load pin's forward facing surface comes in contact with the spring and compresses it against spring retainer 100. Though the location of the spring has changed, its function in the invention is the same.

Likewise, the use of the term "spring" should not be viewed as being limited to a wave spring, helical spring, or any particular type of device. Any component that supplies a resilient force should be considered a spring. As an example, a compressible foam plug placed within spring retainer 100 could serve as a spring.

Although the preceding description contains significant detail, it should not be construed as limiting the scope of the invention but rather as providing illustrations of the preferred embodiments of the invention. As a first example, the embodiment of FIGS. 16 through 18 could easily be modified to allow the insertion of the load pin from either side of the clevis joint. The only thing needed would be the addition of a pair of pockets in first outward facing surface 70 corresponding to the pair of pockets shown in second outward facing surface 92. Likewise, the same mechanism could be provided with one lug and raceway instead of multiple lugs and raceways.

As a second example, although the load pin has been illustrated as including an attached handle, this need not always be the case. The embodiment of FIG. 20 provides a basis for illustrating this variation. FIG. 20 shows a "tool-less" embodiment, meaning that a user can lock and unlock load pin 16 without the need for any separate tool. This is often desirable. However, in other applications, a user may wish to configure the invention to actually require the use of a separate tool. This may be desirable for security reasons, among other reasons. In such an embodiment no handle is provided. Instead, a specially shaped cavity may be provided in the trailing end of load pin 16. A specialized tool configured to mate with this cavity is then provided. A user wishing to unlock the load pin would need to possess this specialized tool.

Figure 1:
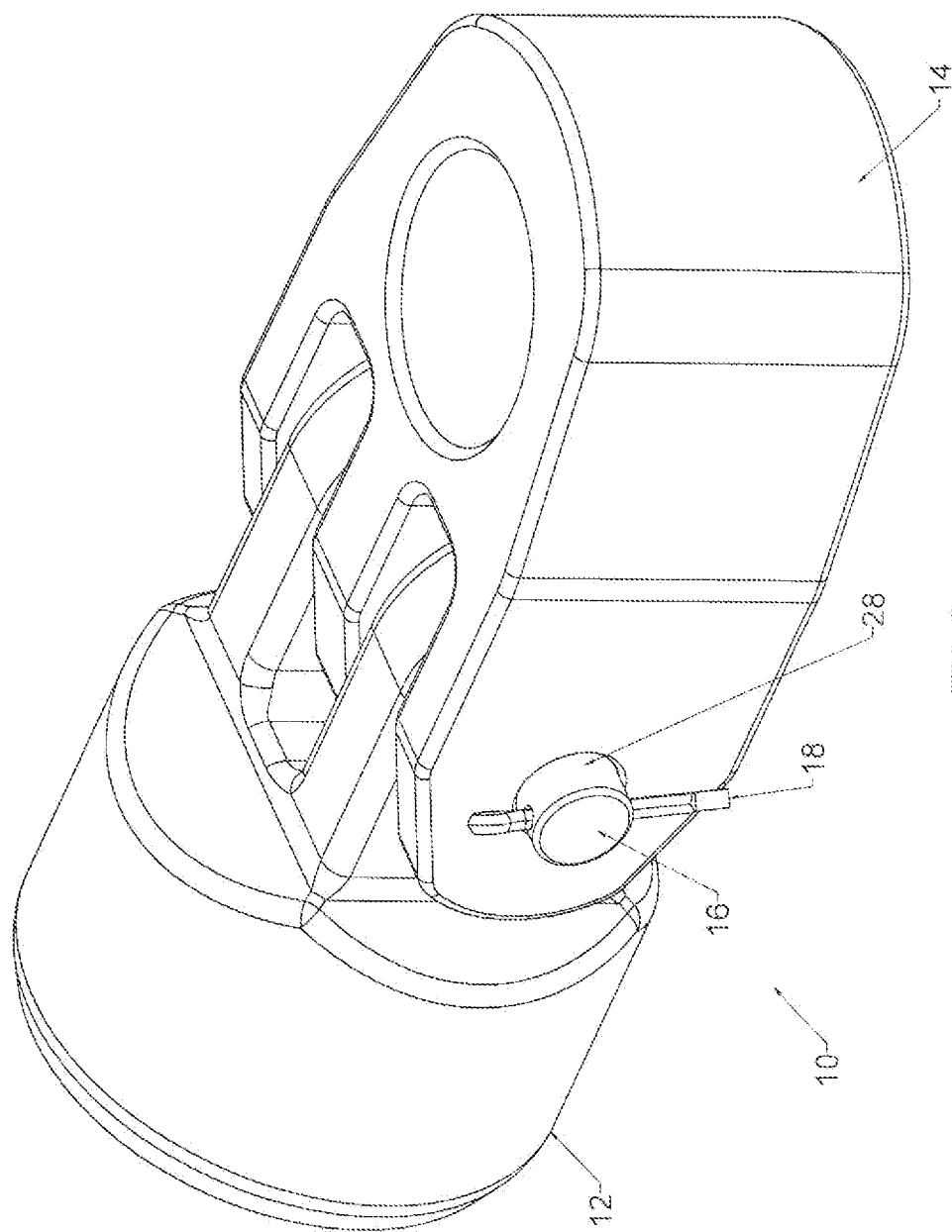
FIG. 1 is a perspective view, showing a prior art pivoting connection.
Figure 2:
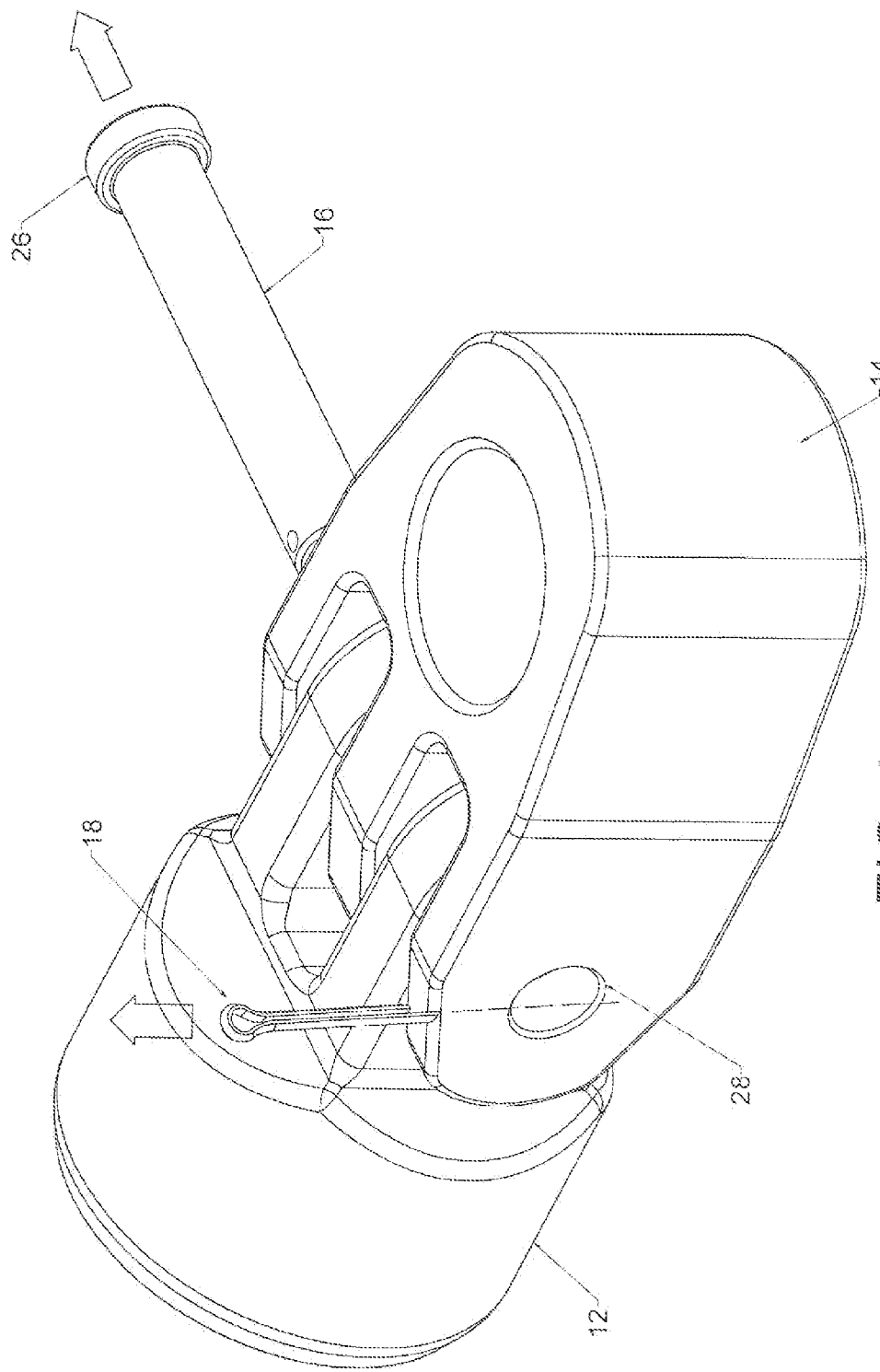
FIG. 2 is a perspective view, showing the disassembly of the connection shown in FIG. 1.
Figure 3:
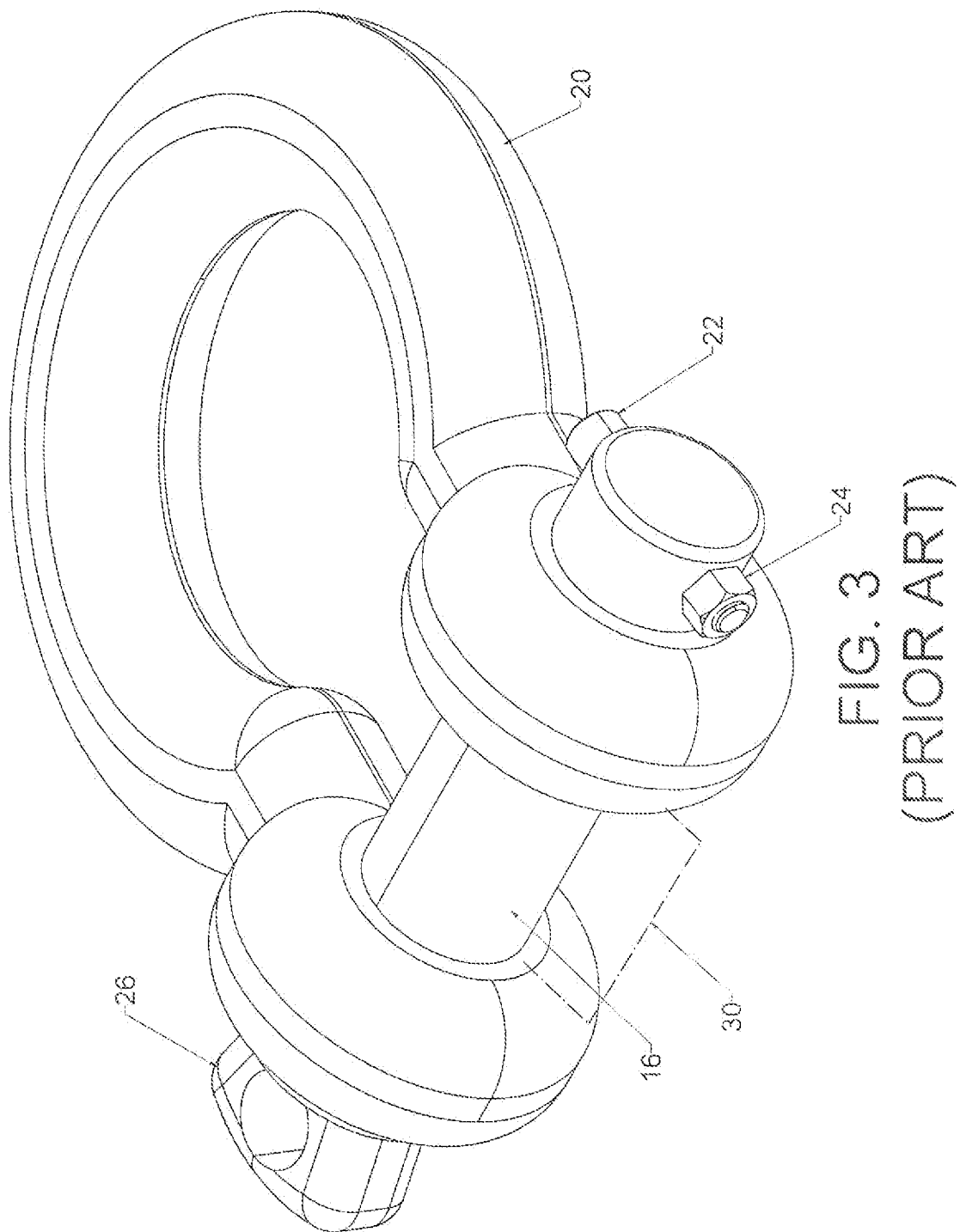
FIG. 3 is a perspective view, showing a prior art shackle with a removable load pin.

As a third example, those skilled in the art will realize that the invention may be applied to joints having more than one open span. The prior art device shown in FIG. 1 provides a good example. Loading component 14 includes two open spans. The features described may easily be applied to such a device.

As still another example, the transverse hole need not pass completely through both halves of the clevis joint. It might only pass part of the way through the outer clevis half while still allowing the invention to function as described.

One may also envision embodiments in which the operation of the spring and locking features are reversed. It is possible to create an embodiment in which the spring pulls the load pin into the clevis joint rather than tending to push it out of the joint. The lugs could then be provided on the shoulder facing outward facing surface 70, with the pockets being located on first outward facing surface 70.

The components used to provide the retention features may also be located outside of the clevis joint itself. For example, a slot pin could be located in a housing extending beyond second outward facing surface 92. The cylindrical portion of the load pin would then be elongated so that an extended portion would protrude beyond the outer clevis half and into the housing containing the slot pin. The slot in the load pin would only need to extend over the length of the extended portion. One could also place the housing for the slot pin outside of first outward facing surface 70.

The constraining features in the slot itself—such as the jog 56—could also assume a wide variety of other forms. Instead of a simple jog, a wave or zig-zag could be provided. Multiple instances of these features could also be provided.

The load pin has been illustrated as a perfect cylinder, but this need not always be the case. The load pin might have cylindrical portions and non-cylindrical portions. It need not have a uniform cross section. The slot in the load pin may also be non-continuous.

The invention has been illustrated primarily in the context of connecting a flexible cable to a fixed point (the transfer of a tensile load). The invention is applicable to many other fields. One good example is the use of the invention to connect rigid structures, such as the truss components of a modular bridge.

These and many other variations will occur to those skilled in the art. Thus, the scope of the present invention should be fixed by the following claims rather than the examples provided.

We claim:

1. A method for unlocking a load pin across an open span between two halves of a clevis joint, comprising:
    a. providing a clevis joint, including,
        i. an inner clevis half,
        ii. an outer clevis half,
        iii. an open span between said inner clevis half and said outer clevis half,
        iv. a transverse hole passing through said inner clevis half and said outer clevis half;
    b. providing a load pin including a cylindrical shaft having a leading end and a trailing end;
    c. providing a spring, wherein said spring is positioned to be compressed by said load pin as said load pin is slid through said transverse hole in a direction proceeding from said inner clevis half toward said outer clevis half;
    d. providing a slot in said load pin, said slot including,
        i. a longitudinal portion having a forward extreme proximate said leading end of said load pin and a rearward extreme proximate said trailing end of said load pin,
        ii. a rotational portion oriented perpendicularly to said longitudinal portion, said rotational portion having a first end and a second end,
        iii. togging portion connecting said rearward extreme of said longitudinal portion to said first end of said rotational portion, said jogging portion having a rearward protrusion that extends toward said trailing end of said pin,
        iv. a locking portion connected to said second end of said rotational portion, said locking portion extending from said rotational portion toward id leading end of said pin;
    e. providing a slot pin extending from said inner clevis half into said transverse hole;
    f. placing said cylindrical shaft of said load pin in said transverse hole in said clevis joint with said slow pin extending into said locking portion of said slot and said cylindrical shaft lying within said inner clevis half and said outer clevis half;
    g. unlocking said load pin by,
        i. pushing said load pin toward said outer clevis half until said slot pin moves into said rotational portion of said slot,
        ii. thereafter rotating said pin until said slot pin rests against said rearward protrusion in said jogging portion,
        iii. thereafter simultaneously pushing said load pin toward said outer clevis half while rotating said load pin so that said jogging portion travels around said load pin and said load pin rests said longitudinal portion, and
        iv. thereafter pulling said load in toward said inner clevis half.

2. The method for unlocking a load pin as recited in claim 1, further comprising:
    a. providing a handle connected to said trailing end of said load pin, said handle including a shoulder; and
    b. said spring being mounted on said cylindrical shaft of said load pin proximate said shoulder.

3. The method for unlocking a load pin as recited in claim 2, wherein:
    a. said inner clevis half including a first outward facing surface; and
    b. said spring being compressed between said first outward facing surface and said shoulder.

4. A method for unlocking a load pin across an open span between two portions of a clevis joint, comprising:
    a. providing a clevis joint, including,
        i. an inner clevis half,
        ii. an outer clevis half,
        iii. an open span between said inner clevis half and said outer clevis half,
        iv. a transverse hole passing through said inner clevis half and said outer clevis half;
    b. providing a load pin including a cylindrical shaft having a leading end and a trailing end, said cylindrical shaft being a sliding fit within said transverse hole;
    c. providing a spring, wherein said spring resists the travel of said load pin in a direction proceeding from said inner clevis half toward said outer clevis half;
    d. providing a slot in said load pin, said slot including,
        i. a longitudinal portion having a rearward extreme proximate said trailing end of said load pin,
        ii. a rotational portion oriented perpendicularly to said longitudinal portion, said rotational portion having a first end and a second end,
        iii. a jogging portion connecting said rearward extreme of said longitudinal portion to said first end of said rotational portion, said jogging portion having a rearward protrusion that extends toward said tailing end of said pin,
        iv. a locking portion connected to said second end of said rotational portion, said looking portion extending from said rotational portion toward said leading end of said pin;
    e. providing a slot pin extending from said inner clevis half into said transverse hole;
    f. placing said cylindrical shaft of said load pin in said transverse hole in said clevis joint with said slot pin extending into said locking portion of said slot and said cylindrical shall lying within said inner clevis half and said outer clevis half;
    g. unlocking said load pin by,
        i. pushing said load pin toward said outer clevis half until said slot pin moves into said rotational portion of said slot,
        ii. thereafter said load pin until said slot pin rests against said rearward protrusion in said jogging portion,
        iii. thereafter simultaneously pushing said load pin toward said outer clevis half while rotating said load pin so that said jogging portion travels around said load pin and said load pin rests in said longitudinal portion, and iv. thereafter pulling said load pin toward said inner clevis half.

5. The method for unlocking a load pin as recited in claim 4, further comprising:

a. providing a handle connected to said trailing end of said load pin, said handle including a shoulder; and b. said spring being mounted on said cylindrical shaft of said load pin proximate said shoulder.

6. The method for unlocking a load pin as recited in claim 5, wherein:

a. said inner clevis half including a first outward facing surface; and b. said spring being compressed between said first outward facing surface and said shoulder.

* * * * *